Dec. 30, 1958   N. ANTON   2,866,485
POWER TOOLS
Filed March 19, 1958   2 Sheets-Sheet 1
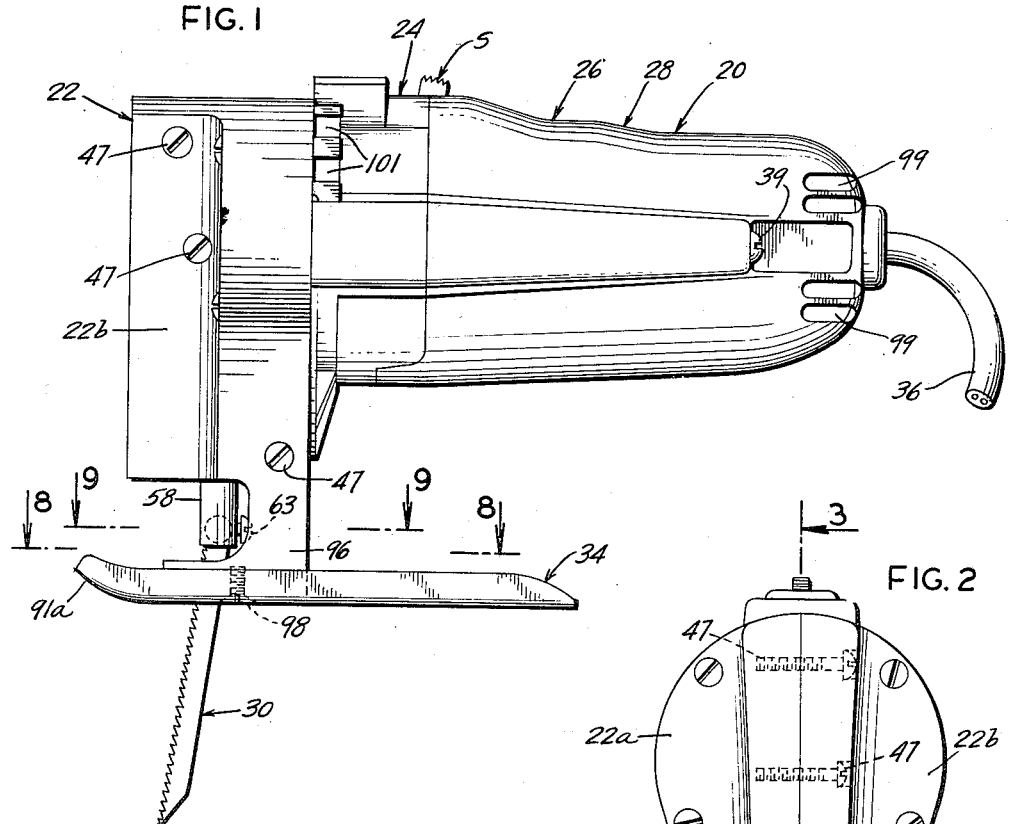
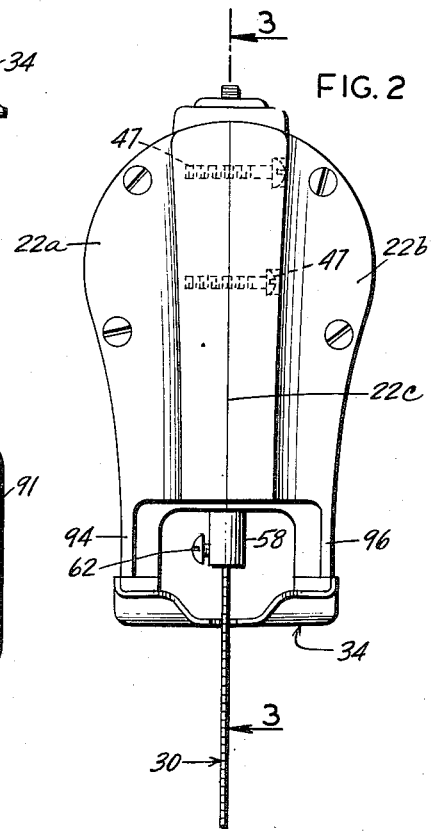
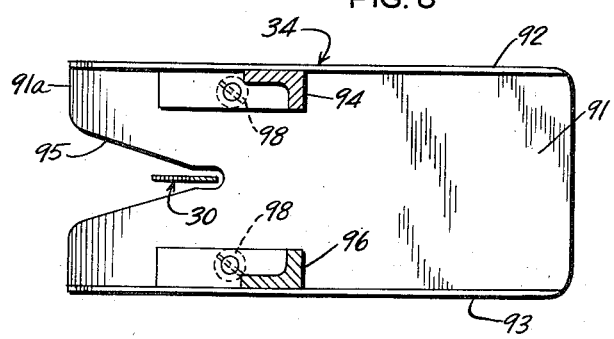
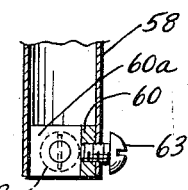
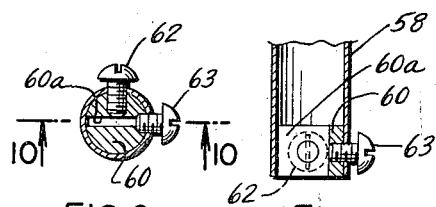
INVENTOR.
NICHOLAS ANTON
BY Wallace and Cannon
ATTORNEYS Dec. 30, 1958
N. ANTON
2,866,485
POWER TOOLS
Filed March 19, 1958
2 Sheets-Sheet 2
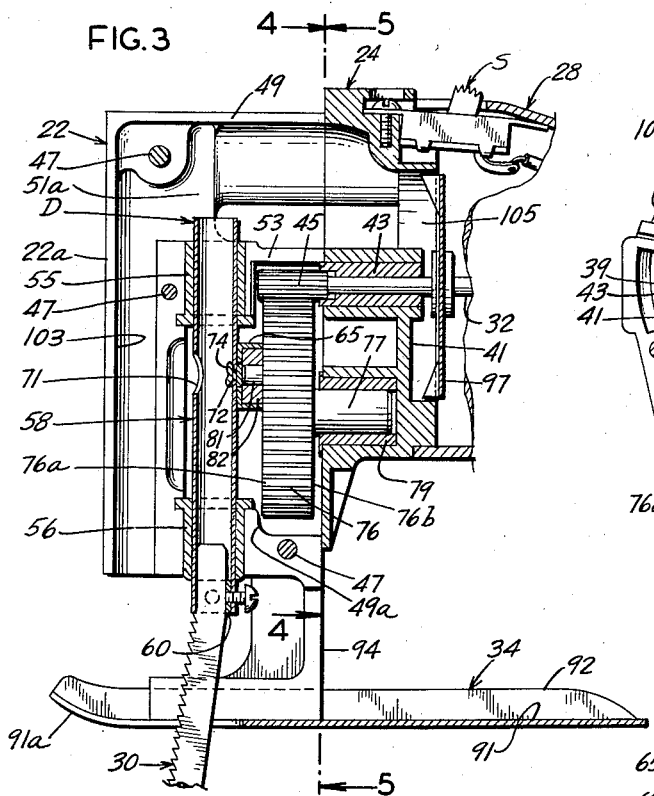
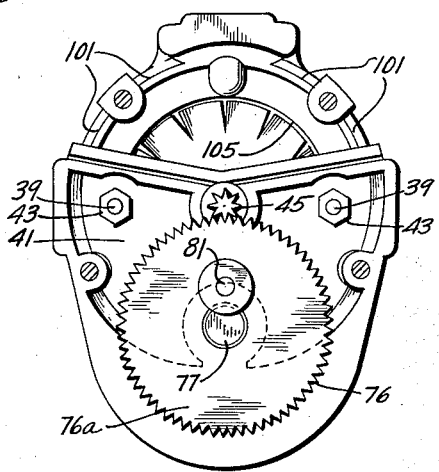
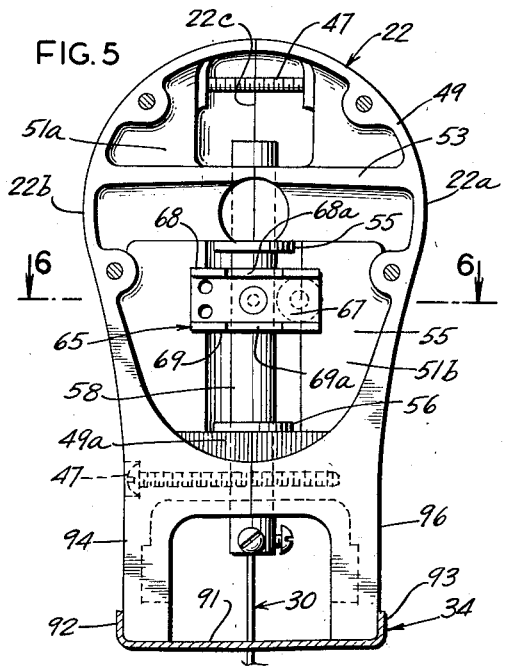
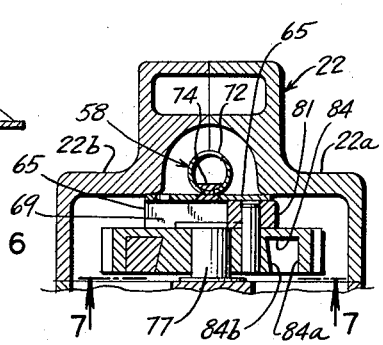
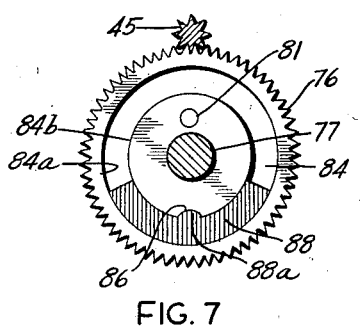
INVENTOR.
NICHOLAS ANTON
BY Wallace and Cannon
ATTORNEYS 2,866,485

POWER TOOLS

Nicholas Anton, Park Ridge, Ill.

Application March 19, 1958, Serial No. 723,079

7 Claims. (Cl. 143—68)

This invention relates to power tools and more specifically to motor-driven reciprocating-blade hand tools for sawing and filing operations and the like and particularly suitable for home workshop use. The present application is a continuation-in-part of a co-pending application, Serial No. 550,109, filed November 30, 1955 now abandoned.

Motor-driven hand saws of the jig saw or sabre saw type, as heretofore known in the art, have been subject to a number of difficulties and disadvantages and have not been outstandingly successful commercially, particularly in the home workshop field. In saws of this kind, the rotary motion of a motor shaft must be translated into reciprocating motion of a drive member or slide which serves as a tool holder for the saw blade. Conventionally, this drive member comprises a steel rod or shaft upon which a crosshead or other mechanical drive connection device is mounted, the rod further having a holding or gripping device mounted at one end thereof to provide a means for mounting a saw blade on the rod. The drive member and the crosshead are subject to considerable shock and stress during operation of the saw, as are component parts of the drive mechanism which connects the crosshead to the drive shaft of the motor. Moreover, because of the reciprocating movement of the drive member and the saw blade, the entire device is subject to severe vibration, a problem which is particularly important where the drive mechanism is inherently asymmetrical in construction.

The previously known drive mechanisms utilized in saws of this kind have been relatively heavy and frequently bulky and have also exhibited substantial frictional losses, thereby materially limiting the overall efficiency of the saw and requiring, in many instances, the use of relatively large and powerful motors. For example, one typical drive mechanism previously used in saws of this kind comprises a pair of spur gears which mesh with each other and which are driven from a pinion mounted on the motor shaft. Eccentric pins are mounted on the two drive gears and engage a crosshead structure which is connected to the drive member or tool holder of the saw. This symmetrical drive mechanism, although it affords some advantages with respect to reduction of vibration, is heavy and relatively inefficient, with the result that a substantial portion of the motor output is wasted in the drive mechanism. Furthermore, a drive mechanism of this kind is considerably more expensive than desirable in many saws, particularly those intended for domestic as opposed to industrial uses. In other previously known arrangements, relatively complex and expensive planetary gearing systems have been utilized. These planetary systems are subject to substantially the same disadvantages and difficulties as the balanced or symmetrical gear arrangements.

Heretofore, it has not been considered feasible to employ an asymmetrical single-gear drive in a motor-driven hand saw of the jig or sabre type because of the circumstances encountered during the operation of the saw and particularly because of the tendency of a drive system of this kind to vibrate excessively. Consequently, it has not been possible to obtain the substantial advantages in efficiency which would be afforded by a single-gear drive directly engaging a crosshead mounted upon the tool holder. By the same token, the very substantial cost advantages afforded by a single-gear drive have not been realized in view of the operational difficulties, particularly with respect to vibration.

A principal object of the invention, therefore, is a new and improved motor-driven hand saw or similar tool of the reciprocating blade type.

A more specific object of the invention is a new and improved motor-driven reciprocating type hand tool comprising a single-gear drive mechanism which is inherently simple and mechanical in construction yet which affords substantial advantages with respect to operating efficiency, vibration characteristics, and the other disadvantages and difficulties of previously known devices as set forth hereinabove.

A particular object of the invention is a new and improved reciprocating type motor-driven hand tool embodying a high efficiency single-gear drive mechanism including a counterbalanced main gear of novel and advantageous construction and a tool holder of minimum weight.

Another object of the invention is a new and improved single-gear drive mechanism for a motor-driven reciprocating type hand saw in which vibration is inherently reduced by reducing the overall weight of the members driven by the main drive gear to a minimum.

One of the particular problems encountered in the single-gear drive mechanisms of the kind upon which the invention is predicated relates to counterbalancing of the main drive gear of the system. It is desirable to employ a relatively thick main gear in order to minimize wear upon the gearing. The use of a relatively thick gear also affords a superior anchor eccentric drive pin usually employed in the important reciprocating motion to the tool holder and affords a weight necessary to obtain some fly wheel action and thereby damp excessive vibration. The use of a relatively thick gear, however, when coupled with mounting of a counterbalance on the face of the gear, may introduce substantial difficulties with respect to axial vibration of the gear in addition to the normal transaxial vibration directly provided by the reciprocating movement of the tool holder. For this reason it is desirable that the counterweight for the gear, in this instance, where a separate counterweight is employed, be located as closely as possible to the face of the gear from which the drive pin extends. Furthermore, conventional externally mounted counterweights are extremely difficult to maintain in position upon a rapidly rotating gear.

Another object of the invention, therefore, is a new and improved motor-driven reciprocating hand saw or the like including a single counterbalanced main gear constructed to inherently minimize axial vibration as well as transverse vibration of the gear.

An additional object of the invention is a new and improved gear construction for the main gear of a motor-driven reciprocating hand saw or the like which affords positive and effective reduction of a counterweight upon the gear.

A further object of the invention is a novel tool of the aforementioned type in which the parts may be constructed and assembled in a novel and expeditious manner.

A specific object of the invention is a new and improved supporting plate for a motor-driven reciprocating type hand tool.

Other and further objects of the present invention will be apparent from the following description and claims and are illustrated in the accompanying drawings which, by way of illustration, show a preferred embodiment of the present invention and the principles thereof and what is now considered to be the best mode for applying those principles. Other embodiments of the invention embodying the same or equivalent principles may be used and structural changes may be made as desired by those skilled in the art without departing from the present invention.

In the drawings:

Fig. 1 is a side elevational view of a power tool embodying the principles of the invention;

Figure 2 is a front elevation view of the power tool shown in Figure 1;

Fig. 3 is a sectional view taken substantially along the line 3—3 in Fig. 2;

Fig. 4 is a front elevational view, substantially along the line 4—4 in Fig. 3, with the front housing of the power tool removed;

Fig. 5 is a view taken substantially along the line 5—5 in Fig. 3 of the front housing of the power tool with the intermediate housing and motor of the power tool removed;

Fig. 6 is a detail sectional view of a portion of the power tool shown in Fig. 3 looking in the direction of the lines 6—6 in Fig. 5;

Fig. 7 is a detail sectional view taken substantially along the line 7—7 in Fig. 6;

Fig. 8 is a detail sectional view taken substantially along the line 8—8 in Fig. 1;

Fig. 9 is a detail sectional view taken substantially along the line 9—9 in Fig. 1;

Fig. 10 is a detail sectional view taken substantially along the line 10—10 in Fig. 9.

A power tool 20, embodying the principles of the invention is shown in the drawings to illustrate the preferred embodiment thereof.

In general, the power tool 20 embodies a front housing 22, mounted on an intermediate housing 24 which in turn is mounted on the front end portion of the housing 26 of an electric motor 28. A drive mechanism D is mounted in the front housing 22 and in the intermediate housing 24 for reciprocating a suitable tool member such as, for example, a saw blade 30, upon rotation of the drive shaft 32 of the motor 28, Figs. 1 and 3. A guide plate 34, which also affords a supporting stand for the power tool 20, is mounted on the lower end portion of the front housing 22 in depending relation thereto, Figs. 1, 2 and 3.

The motor 28 is preferably of the universal type, and may be connected to a suitable source of electric power, not shown, by lead wires 36 connected to the motor 28 through a switch S mounted in the housing 26 of the motor 28. The housing 26 of the motor 28 affords the handle by which an operator supports and manipulates the power tool 20.

The intermediate housing 24 is releasably secured to the front end portion of the housing 26 and to the motor 28 by the bolts 39 mounted in the housing 26 and extending through the rear wall 41 of the intermediate housing 24. Suitable nuts 43 are mounted on the front end portion of the bolts 39 to releasably clamp the intermediate housing 24 against the front end portion of the motor housing 26, Figs. 1 and 4.

The drive shaft 32 of the motor 28 projects forwardly from the housing 26 and is journalled in a bearing 43 mounted in the rear wall 41 of the intermediate housing 24. A gear 45 is mounted on the drive shaft 32 of the motor 28 in position to project into the front housing 22 when the latter is mounted on the intermediate housing 24.

The front housing 22 is substantially cup shaped, Figs. 3 and 5, and is formed in two parts 22a and 22b which are disposed in abutting relation to each other along the vertical center line 22c of the housing 22. The center line 22c intersects the longitudinal axis of the drive shaft 32 and is substantially perpendicular thereto when the housing 22 is mounted in operative position on the motor 28. The two parts 22a and 22b of the housing 22 are releasably secured together by suitable means such as the screws or bolts 47, Figs. 1 and 5.

A rearwardly projecting continuous flange 49 laterally defines a rearwardly opening recess 51 in the housing 22, Figs. 3 and 5. A horizontally disposed partition wall 53 extends across the recess 51 and effectively divides the latter into an upper portion 51a and a lower portion 51b, Fig. 5. Two substantially tubular shaped bearings 55 and 56 are mounted in the partition wall 53 and in the lower end portion 49a of the flange 49, respectively. An elongated slide or toolholder 58 is slidably mounted in the guides 55 and 56 and projects downwardly from the lower end portion 49a of the flange 49, Fig. 3. The slide 58 should be made relatively light in weight, as explained more fully hereinafter; in the illustrated embodiment the toolholder is fabricated from seamless steel tubing.

A plug 60 is mounted in the lower end portion of the tubular member 58, Figs. 3, 9 and 10, and has a forwardly opening slot 60a formed therein for the reception of the upper end portion of the shank of the saw blade 30. The plug 60 may be secured in the lower end portion of the slide 58 by suitable means, such as by soldering. Two screws 62 and 63 extend through the side walls of the lower end portion of the slide 58 in substantially perpendicular relation to each other, Fig. 9, and are threaded into the plug 60 in position to be moved into and out of the slot 60a. The screw 63 is disposed in the plug 60 in position to be screwed into the rear end portion of the slot 60a, and the screw 62 is disposed in the plug 60 in position to be screwed into the slot 60a from the side thereof, Fig. 9. Hence, it will be seen that the screws 62 and 63 afford effective clamping devices for holding a tool such as the saw blade 30 in the slide 58, the screw 63 being effective to clamp the upper end portion of the saw blade 30 against the inner face of the front side of the slide 58, and the screw 62 being effective to clamp the lateral side of the upper end portion of the saw blade 30 against the portion of the plug 60 defining the opposite side of the slot 60a from the side in which the screw 62 is mounted.

A crosshead 65, Figs. 3, 5 and 6, made of suitable material such as tempered steel, is secured, in perpendicularly extending relation, to the central portion of the slide 58. The crosshead 65 is substantially rectangular in shape, having a front wall 67, a top side wall 68 and a bottom side wall 69. The front wall 67 is disposed in a substantially vertical plane when the power tool 20 is in normal operating position, and the top wall 68 and bottom wall 69 are disposed perpendicular thereto and project substantially horizontally from the upper and lower longitudinal edge portions of the front wall 67.

The slide member 58 has two openings 71 and 72 formed in the central portion thereof, the openings 71 and 72 being in diametrically disposed relation to each other, Fig. 3. The opening 72 is of a size to receive a rivet therethrough, and the opening 71 is of a substantially larger size for a purpose which will be discussed in greater detail presently.

The crosshead 65 is mounted on the toolholder 58 in such position that the longitudinal and lateral center thereof is disposed in axial alignment with the openings 71 and 72. In attaching the crosshead 68 to the slide 58, a rivet 74 may be inserted through the opening 72 and the front wall 67 of the crosshead 65, with the head of the rivet 74 disposed in juxtaposition to the inner face of that portion of the tubular slide 58 defining the opening 72. A bucking tool may then be inserted through the opening 71 into engagement with the head of the rivet 74, and the crosshead 65 securely attached by the rivet 74 to the slide 58. The securing of the crosshead 65 to the slide 58 may be completed by a silver-soldering operation. In performing this operation, one electrode of a resistance soldering device, not shown, may be inserted through the opening 71 into engagement with the head of the rivet 74 and the other electrode of the soldering device may be engaged with the other end of the rivet 74. Current may then be passed by the soldering device through the rivet 74 to thereby heat the central portion of the crosshead 65, and the underlying portion of the side wall of the slide 58 to a temperature wherein silver solder may be applied to the edges of the junction between the crosshead 65 and the slide 58 and caused to flow between these two members. The slide 58 and the cross bar 65 may then be quickly quenched. By attaching the crosshead 65 to the slide 58 in this manner, the slide 58 may be constructed of relatively thin tubular steel, and that the crosshead 65 may be constructed of relatively thin steel which, prior to attachment to the slide 58, has been tempered to a relatively high degree of hardness. The soldering operation, when performed in the aforementioned manner, is effectively performed so quickly that the heat flow through the body of the crosshead 65 is relatively small so that the temper of the rear edge portions of the side walls 68 and 69 of the crosshead 65 is affected relatively little, and these portions retain a relatively high temper.

A spur gear 76 having an axial shaft 77 is rotatably mounted on the rear wall 41 of the intermediate housing 24 in position to mesh with the gear 45 within the front housing 22, when the latter is mounted in operative position on the intermediate housing 24. The shaft 77 is removably journalled in a bearing 79 mounted in the intermediate housing 24, Fig. 3. The gear 76 has a front face 76a and a rear face 76b, Fig. 3, and a pin 81 is eccentrically mounted in the gear 76 and projects forwardly from the front face 76a thereof, Figs. 3 and 4. A roller 82 is rotatably mounted on the pin 81 in juxtaposition to the front face 76a of the gear 76. The roller 82 is so disposed on the front face of the gear 76 that, when the front housing 22, with the slide 58 and the crosshead 65 disposed therein, is mounted on the intermediate housing 24, the roller 82 is disposed in the crosshead 65. The roller 82 is of such diameter that it fits snugly between the side walls 68 and 69 of the crosshead 65 but is freely movable therealong.

The gear 76 is preferably made of tempered steel, and when the guide 58 and crosshead 65 are disposed in the aforementioned operative position relative thereto, the rear edge portions of the side walls 68 and 69 are disposed in juxtaposition to the front face 76a of the gear 76. Hence, it will be seen that upon rotation of the gear 76, the crosshead 65 and, therefore, the slide 58 are moved upwardly and downwardly as viewed in Figs. 3 and 5, by the roller 82, with the rear edges of the side walls 68 and 69 of the crosshead 65 sliding over the front face 76a of the gear 76 in abutting engagement therewith. The rear edge portions of the side walls 68 and 69 of the crosshead 65 are provided with recesses 68a and 69a, respectively, Figs. 5 and 6, formed in the longitudinal center portions thereof. The recesses 68a and 69a are of greater length than the diameter of the shaft 77, consequently, during upward and downward movement of the crosshead 65 across the front face 76a of the gear 76, the rear edge portions of the side walls 68 and 69 of the crosshead 65 do not engage the front end of the shaft 77. In this manner, it is rendered unimportant that the shaft 77 terminate at its front end portion exactly flush with the front face 76a of the gear 76. The recesses 68a and 69a preferably are of the order of ten-thousandths of an inch deep, thereby affording effective clearance between the central portion of the crosshead 65 and the front face of the gear 76 in alignment with the shaft 77.

An annular recess 84 is formed in the rear face 76b of the gear 76, Figs. 6 and 7, in concentric relation to the outer periphery of the gear 76. The outer peripheral side wall 84a of the recess 84 is substantially perpendicular to the face 76b of the gear 76 but the inner peripheral side wall 84b of the recess 84 is preferably undercut for a purpose discussed in greater detail hereinafter. A substantially arcuate shaped recess 86 is formed in the inner side wall 84b of the recess 84 on the opposite side of the shaft 77 from the pin 81, Fig. 7.

A counterweight 88, formed of any suitable material such as, for example, lead or the like, is mounted in the recess 84 in the gear 76, in substantially diametrically opposed position relative to the pin 81. The counterweight 88 is substantially arcuate in shape, and has a boss 88a formed on the inner peripheral edge portion thereof. The counterweight 88 is of such size and configuration that it may be readily inserted into the recess 84 on the opposite side of the shaft 77 from the pin 81, with the boss 88a disposed in the recess 86, and the main body portion of the counterweight 88 disposed between the side walls 84a and 84b. When the counterweight 88 is initially inserted into the recess 84, and is disposed in abutting relation to the front face of the recess 84, the rear edge portion of the counterweight 88 preferably projects outwardly a slight distance from the rear face 76b of the gear 76. Thereafter, by a suitable stamping operation, or the like, the counterweight 88 may be pressed firmly into the recess 88 to thereby cause the relatively soft material from which it is formed such as, for example, lead, to flow into the recess 84 sufficiently that the inner peripheral edge portion of the counterweight is forced into underlying position relative to the inner side wall 84b of the recess 84, and the rear edge of the counterweight 88 is flush with the rear face 76b of the gear 76. When so mounted in the recess 84, the counterweight 88 is firmly held against movement relative thereto in any direction.

The counterweight 88 is of sufficient mass and is so disposed, as to afford an effective balance for the pin 81 and the roller 82 and the other moving parts such as the slide 58, crosshead 65, and saw blade 30, during the operation of the power tool 20. Because of the counterweight being disposed within the recess 84 it is securely retained in position on the gear 76 and does not tend to become dislodged therefrom during operation of the power tool 20. Indeed, the mounting arrangement for the counterweight is far superior to the conventional exterior mounting arrangements in this regard, since it is extremely difficult to fix the counterweight to an external surface of a high speed gear of this kind in a manner which will effectively prevent shifting or even complete detachment of the counterweight from the gear.

The construction of the hand operated power tool 20, as described hereinabove, affords very substantial advantages and benefits as compared with previously known tools, provided certain critical constructional requirements are adhered to. A principal and essential factor in this regard is the weight of the several parts of the drive mechanism which are reciprocated by rotation of the single driving and counterbalancing gear 76 and particularly the slide or tool holder 58 and the parts mounted thereon. The effective weight of the slide, including the parts mounted thereon, and effectively connected thereto, must be made less than 1.6 ounces and preferably less than 1.3 ounces. Otherwise, it is not possible to achieve an effective working balance in a single gear drive mechanism of the kind described hereinabove, with the result that excessive vibration is encountered. In the commercial version of the power tool 20, for example, in which the operating speed is of the order of 2500 to 3200 strokes per minute, the overall weight of the slide 58, the crosshead 65, the plug 60, the screws 62 and 63, the drive pin 81, and the roller 82, together with the saw blade 30 is of the order of 1.05 ounces, the weight of the blade being of the order of 0.07 ounce; thus the weight of the cross head, the complete slide, and the pin means is 0.98 ounce.

If conventional practice is followed and a steel bar or rod is incorporated in the single-gear drive mechanism of the power tool 20, the mechanism vibrates excessively. Consequently, a power tool constructed in this manner is extremely desirable and, indeed, almost useless from a commercial standpoint. Although it may be possible to counterbalance the mechanism with respect to vertical or transverse vibration, this expedient almost invariably leads to excessively axial vibration or "whip" of the gear 76 by virtue of the excessive size of the counterweights required and the axial displacement of those weights with respect to the pin 81 connecting the gear to the slide 58. Furthermore, the use of a heavy slide or tool holder reduces the effectiveness of the fly wheel action of the gear 76 with respect to damping of vibrational forces in the drive mechanism. Stated differently, the relatively small weight of the reciprocating parts and the use of a relatively small counterweight permit the establishment of a balanced relationship between the parts which is effectvie to suppress vibration in a direction parallel to the axis of the tool holder slide 58 and also in a direction transverse to the axis of the slide.

The construction of the gear 76 is also advantageous with respect to reduction of vibrations in the drive mechanism. In the commercial version of the power tool 20 the gear 76 has a diameter of 1 11/16 inches, a thickness of 3/8 inch and a weight of approximately 2.25 ounces. A relatively thick gear of this kind affords a maximum bearing with respect to the pinion 45 and consequently reduces the possibility of excessive wear on this portion of the tool. In addition the relatively thick gear affords a strong and stable mounting for the drive pin 81 and the shaft 77 of the gear. The recess 84 in the commercial version of the tool 20 has an outside diameter of 1 3/8 inches, an inner diameter at the inside edge of 15/16 inch and a depth of 1/4 inch; the inner wall 84b is preferably undercut at an angle of 7° although this is not essential. As pointed out hereinabove the recess affords an excellent mounting arrangement for the counterweight 88 and prevents shifting of the counterweight or detachment thereof from the main gear 76 despite high speed operation of the power tool. Counterweight 88 should be confined to a minor arc of the recess 84 preferably less than 120°; in the illustrated embodiment the arc described by the counterweight subtends an angle of approximately 110°. From the foregoing dimensions for the counterweight, and considering that it is formed from lead, it is seen that the counterweight has a weight bearing a predetermined relationship to and substantially smaller than the total weight of the tool holder slide, the crosshead, and the pin means as set forth hereinabove. The pin 81 is located 5/16 inch radially outwardly of the axis of the shaft 77; the combined weight of the pin 81 and the roller 82 is approximately 0.15 ounce.

The principal critical factor to be followed in constructing the power tool 20, in accordance with the invention, is the weight of the slide member 58 and the other parts of the drive mechanism which are subject to reciprocating movement. By maintaining this weight within the limits set forth hereinabove, a practical and efficient tool may be constructed without the vibration, efficiency and other difficulties of previously known tools. A construction of the gear 76 and the mounting of the counterweight 88 thereon are also highly advantageous, as is the use of a tubular member for the slide 58.

The guide plate 34 preferably is substantially rectangular in shape, Figs. 1, 3 and 8, having a bottom wall 91, and two upstanding side walls 92 and 93 projecting upwardly from the opposite longitudinal edges of the bottom wall 91 in substantially parallel relation to each other. The front end portion 91a of the bottom wall 91 is preferably turned up at an angle of approximately 25°, and an upwardly opening substantially V-shaped recess 95 is formed in the forward end portion of the bottom wall 91 in alignment with the longitudinal center line thereof, Fig. 8. The recess 95 is of such size and configuration that the hand tool, such as the saw blade 30 mounted in operative position in the slide 58 may project downwardly therethrough for reciprocation by the slide 58 upwardly and downwardly through the forward end portion of the guide plate 34.

The guide plate 34 is secured to the bottom of downwardly projecting legs 94 and 96 on the front housing 22, by means of screws 98, which extend upwardly through the bottom wall 91 of the guide plate 34 and are threaded into the legs 94 and 96, Figs. 1, 2 and 8. The heads of the screws 98 are counter-sunk in the bottom face of the bottom wall 91 of the guide plate 34.

A common failure of power tools heretofore known in the art, of general type to which the present invention relates, and which embodied guide plates of the general type of the guide plate 34, has been that when the tool is used to saw a board, or the like, the guide plate, in moving over the board, leaves a marring line along the path of travel of either one, or both, of the longitudinal edges of the guide plate. This is particularly distressing when the sawing operation is performed on a board, or the like, wherein the guide plate travels over a finished surface.

The power tool 20 is constructed in a manner to eliminate this undesirable operation. In such power tools heretofore known in the art, the guide plates used are commonly flat in a lateral direction across the bottom. In the power tool 20, the bottom face of the bottom wall 91 of the guide plate 34 is slanted upwardly at an outwardly opening acute angle from the longitudinal center line thereof to each of the respective longitudinal edges thereof, as shown in somewhat exaggerated form in Fig. 2. In practice, with a guide plate having a width of approximately 2 1/8 inches, a practical upwardly sloping of the bottom face thereof in both directions from the longitudinal center line thereof is afforded when the longitudinal edges of the bottom face are disposed 1/64 of an inch above that portion of the bottom face disposed along the longitudinal center line of the guide plate.

With this construction, when the tool 20 is being used to saw a board, or the like, with the guide plate 34 resting on the upper face of the board being cut, the bottom face of the plate 34 is sufficiently close to being flat in a lateral direction so as not to permit an undesirable amount of lateral rocking. However, with this substantially V-shape of the bottom face of the bottom wall 91 of the guide plate 34, the contact of the plate 34 with the surface of the board, or the like, being cut is normally along the line of travel of the saw blade 30. Hence, in such operations, no noticeable marring of the surface over which the guide plate 34 travels is produced.

A fan 97 is mounted on the drive shaft 32 of the motor 28, in position to be disposed within the rear edge portion of the intermediate member 24, when the latter is mounted in position on the motor housing 26. A plurality of openings 99 are formed in the rear end portion of the motor housing 26, and a plurality of openings 101 are likewise formed in the upper front edge portion of the intermediate housing 24.

A substantially vertical passageway 103, Fig. 3, is formed in the front central portion of the front housing 22. The passageway 103 terminates at its lower end portion in vertical alignment with the longitudinal center line of the front end portion 91a of the bottom wall 91 of the guide plate 34. The upper end portion of the passageway 103 terminates in communication with the upper portion 51a of the recess 51 in the housing 22. It will be remembered that this latter portion of the recess 51 is disposed above the partition wall 53 in the housing 22. When the front housing 22 is disposed in operative position on the intermediate housing 24, the partition wall 53 is disposed in abutting relation to the forwardly projecting flange 41a on the upper edge portion of the rear wall 41 of the intermediate housing 24. This rear wall 41 terminates at its upper end portion in spaced relation to the upper end portion of the housing 24 to thereby afford a passageway 105 between the motor housing 26 and the upper portion 51a of the recess 51 in the front housing 22.

Hence, it will be seen that upon rotation of the fan 97 with the drive shaft 32, air is drawn in through the openings 99 in the motor housing 26 forwardly through the motor housing 26, to thereby cool the motor 28, and is discharged upwardly through the openings 101 in the intermediate housing 24, and forwardly and downwardly through the upper end portion 51a of the recess 51 and the passageway 103 downwardly on to the front end portion of the guide plate 34. The air discharged downwardly through the passageway 103 is effective to blow the sawdust, or like debris, away from the leading edge of the cutting tool, such as the saw blade 30, to thereby assist the operator in following any cutting lines, or the like, marked on the article being cut.

From the foregoing, it will be seen that the invention affords a novel power tool wherein the reciprocating parts thereof may be constructed of practical light members. Also, it will be seen that the power tool of the invention effectively provides for moving parts which may be readily and effectively balanced in a novel and expeditious manner. In addition, the parts of the power tool may be effectively and efficiently constructed and assembled in a novel and expeditious manner.

Furthermore, the power tool of the invention may be easily manually handled and manipulated by an operator and affords a novel and practical hand-operated tool which is effective and efficient in operation for performing sawing and filing operations and the like.

Thus, the preferred embodiment of the invention has been illustrated and described, and it is to be understood that this is capable of variation and modification and the invention is not to be limited to the precise details set forth but includes all such changes and alterations as fall within the purview of the following claims.

I claim:

1. In a device for reciprocating a tool member, a housing having two spaced bearings mounted therein, a drive shaft, means for rotating said drive shaft, means for reciprocably supporting such a tool member, said last named means comprising an elongated tubular member reciprocably mounted in said bearings and having two opposite end portions adjacent to, and separated by, an intermediate portion, the interior of said intermediate portion and one of said end portions being open, means in the other of said end portions for supportingly engaging said tool member, said tubular member having an opening extending through one side of said intermediate portion, means including an elongated cross head for connecting said tubular member to said drive shaft for reciprocation by the latter during rotation of said shaft, said cross head being tempered to relatively high degree of hardness, and means for drivingly connecting said cross head to the outer periphery of said intermediate portion of said tubular member diametrically opposite to said opening, said last-mentioned means comprising heat fusion means including fused metal disposed between and in engagement with the adjacent surfaces of said cross head and said intermediate portion to adhesively secure said cross head to said intermediate portion and preventing relative movement therebetween.

2. In a power tool of the type embodying an electric motor, a housing on said motor, said housing having two spaced bearings mounted therein, and a gear mounted in said housing in position to be rotated by said motor, means for reciprocating a tool member relative to said housing upon rotation of said gear, said means comprising a substantially straight elongated tubular member slidably mounted in said bearings, said tubular member having two axially aligned openings in the sidewalls thereof, a cross head tempered to a relatively high degree of hardness mounted on said tubular member in overlying relation to one of said openings in position to be connected to said gear for reciprocation thereby, a rivet extending through said one opening and a portion of said cross head in position to secure said cross head to said tubular member, said rivet terminating at one end in said tubular member in spaced relation to the other of said openings, and heat fusion means adhesively securing said cross head to said tubular member, said heat fusion means including fused metal disposed between and in engagement with the adjacent surfaces of said slideway and said intermediate portion.

3. In a power tool of the type embodying an elongated saw blade, and means for longitudinally reciprocating said saw blade along a longitudinal axis for cutting an article of work transversely to one surface of said article, means for guiding said saw blade across said article of work, said last named means comprising an elongated guide plate having a supporting surface with oppositely disposed longitudinal edges, said supporting surface having a longitudinal center line, said saw blade extending through said supporting surface on said center line and being reciprocable therethrough during the cutting of said article of work, said supporting surface comprising two substantially planar surfaces sloping upwardly away from one another at acute angles of approximately one degree from a plane passing through said longitudinal center line and perpendicular to said axis in both lateral directions from said center line thereof to each of said longitudinal edges throughout substantially the entire length of each of said edges, said supporting surface being disposed in position relative to said saw blade to engage said one surface during said cutting of said articles to guidingly support said saw blade relative to said articles.

4. A device for reciprocating a saw blade, file, or like tool member, comprising a casing, a drive shaft rotatably mounted within said casing, a pinion mounted on said drive shaft, means for reciprocably supporting such tool member, said means including a single elongated tool holder slide mounted in the casing for reciprocation along its long axis, a cross head mounted intermediate its ends on said tool holder slide and having unsupported end portions projecting laterally therefrom, a single driving spur gear mounted in meshing engagement with said pinion and constituting the only drive gear linking said pinion in mechanical driving relation with said cross head, said spur gear having pin means eccentrically mounted thereon and projecting from one axial face thereof in operative engagement with said cross head to reciprocate said cross head and said tool holder slide upon rotation of said spur gear, said pin means being disposed in alignment with said tool holder slide when said pin means is in its top and bottom dead center positions in said cross head and relative to said spur gear, and a counterweight mounted on said spur gear, said counterweight having a weight bearing a predetermined relationship to and being substantially smaller than the total weight of said tool holder slide, said crosshead, and said pin means, and said total weight of said tool holder slide, said crosshead, and said pin means being relatively small, whereby a balanced relationship is established between the aforesaid parts which is effective to suppress vibration in a direction parallel to the axis of said tool holder slide and also in a direction transverse to the axis of said tool holder slide.

5. A device as defined in and by claim 4 wherein the casing comprises two complementary secured together sections, spaced apart aligned bearings being mounted and held between the said two casing sections, and the slide being mounted in the said bearings.

6. A device as defined in and by claim 4 in which said single spur gear has two substantially parallel axial faces, and in which said pin means projects from one of said axial faces, and in which the other of said axial faces is provided with an annular recess, and in which said counterweight is of arcuate configuration and is mounted within said annular recess.

7. A device for reciprocating a saw blade, file, or like tool member, comprising a casing, a drive shaft rotatably mounted within said casing, a pinion mounted on said drive shaft, means for reciprocably supporting such tool member, said means including a single elongated tool holder slide mounted in the casing for reciprocation along its long axis, a cross head mounted intermediate its ends on said tool holder slide and having unsupported end portions projecting laterally therefrom, a single driving spur gear mounted in meshing engagement with said pinion and constituting the only drive gear linking said pinion in mechanical driving relation with said crosshead, said spur gear having pin means eccentrically mounted thereon and projecting from one axial face thereof in operative engagement with said crosshead to reciprocate said crosshead and said tool holder slide upon rotation of said spur gear, and counterweight means on said spur gear, said counterweight means having an effective counterbalancing weight bearing a predetermined relationship to and being substantially smaller than the total weight of said tool holder slide, said crosshead, and said pin means, and said total weight of said tool holder slide, said crosshead, and said pin means being relatively small, whereby a balanced relationship is established between the aforesaid parts which is effective to suppress vibration in a direction parallel to the axis of said tool holder slide and also in a direction transverse to the axis of said tool holder slide.

References Cited in the file of this patent

UNITED STATES PATENTS

| | | |
|---|---|---|
| 465,699 | Hardwick | Dec. 22, 1891 |
| 2,262,706 | Benda | Nov. 11, 1941 |
| 2,610,524 | Maust | Sept. 16, 1952 |
| 2,639,737 | Forsberg | May 26, 1953 |
| 2,704,941 | Holford | Mar. 29, 1955 |
| 2,736,203 | Shore | Feb. 28, 1956 |
| 2,808,082 | Moretti et al. | Oct. 1, 1957 |